T. METZELER.
TALKING MACHINE.
APPLICATION FILED APR. 6, 1914.
1,137,883.
Patented May 4, 1915
2 SHEETS—SHEET 1.
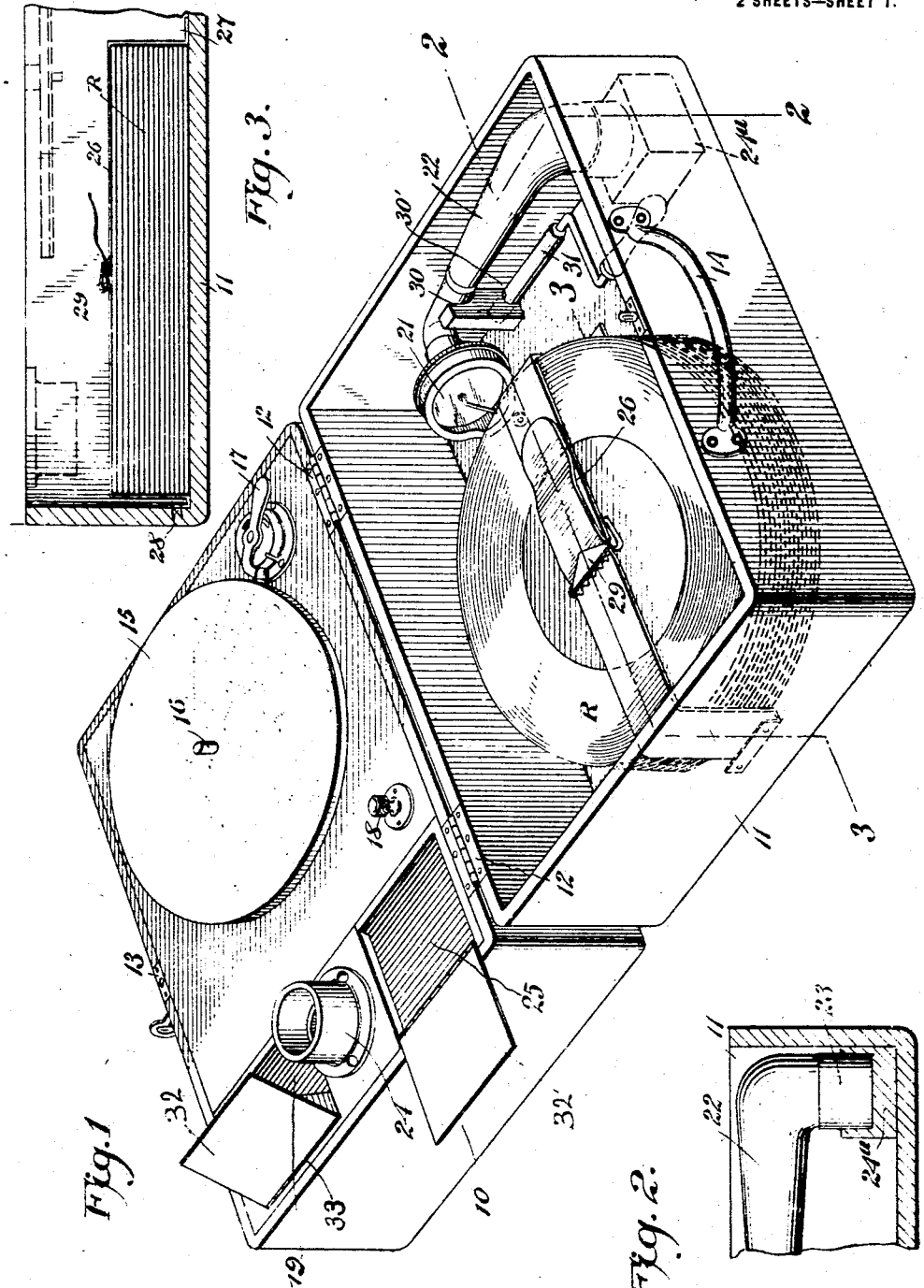
WITNESSES
K. G. Leard
S. M. Backer
INVENTOR
Theodore Metzeler
BY
Mastick & Lucke
ATTORNEYS T. METZELER.
TALKING MACHINE.
APPLICATION FILED APR. 6, 1914.
1,137,883.
Patented May 4, 1915.
2 SHEETS—SHEET 2.
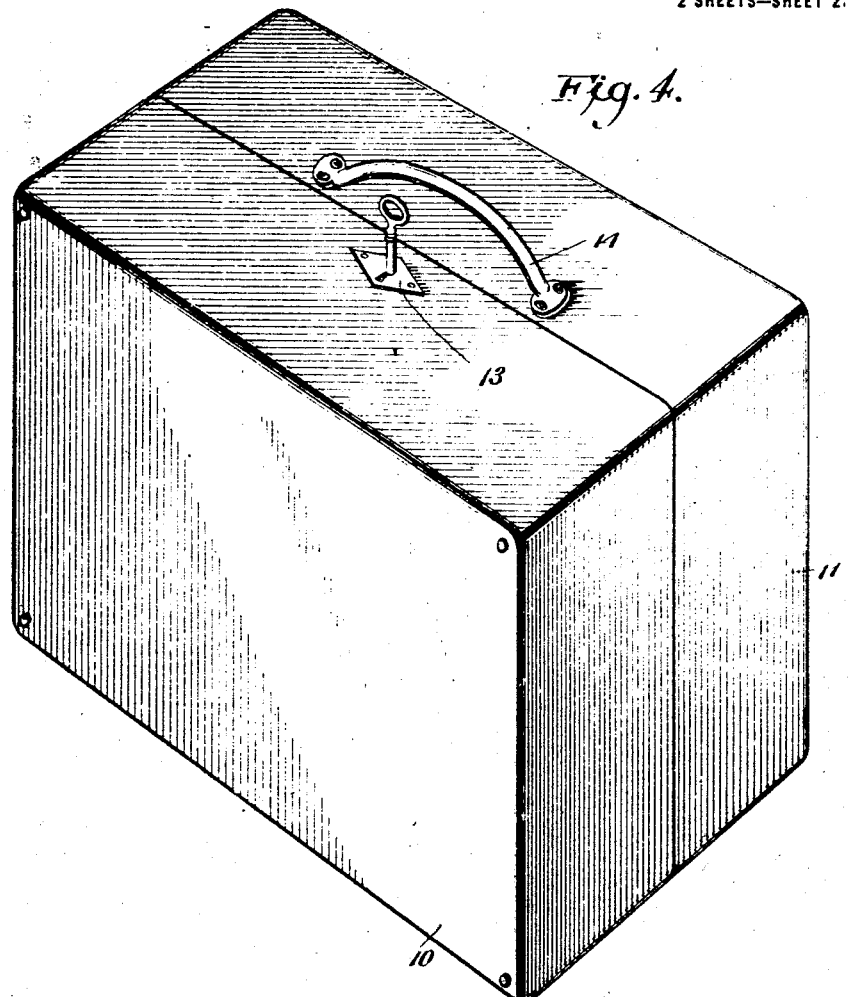
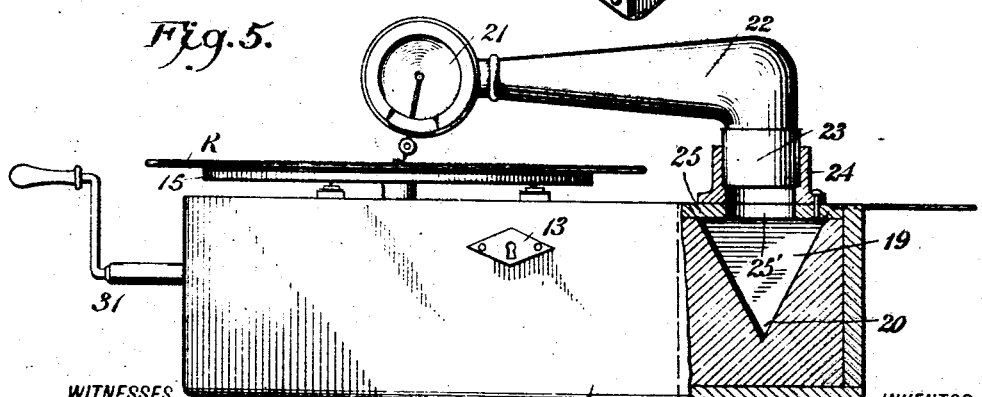

UNITED STATES PATENT OFFICE.

THEODORE METZELER, OF NEW YORK, N. Y.

TALKING-MACHINE.

1,137,883. Specification of Letters Patent. Patented May 4, 1915.

Application filed April 6, 1914. Serial No. 829,822.

*To all whom it may concern:*

Be it known that I, THEODORE METZELER, a citizen of the United States of America, and a resident of the borough of Brooklyn, county of Kings, city of New York, State of New York, have invented certain new and useful Improvements in Talking-Machines, of which the following is a specification.

This invention relates to talking machines and has as its objects the production of such machines in a simple, compact and portable form; the production of such machines which may be used without an amplifying horn but will still give an amplified sound in a manner pleasing to the ear, together with means for intermittently damping the sound so as to produce the effect of a swell in tone. I accomplish these objects by extremely simple and inexpensive means together with other objects as will hereinafter appear.

The preferred form of device is so constructed as to simulate a dress-suit case, with a smooth, unbroken outer surface, without unseemly or conspicuous projections or projecting apparatus of any kind extending through any portion of it. To arrange the talking machine apparatus and the necessary records, preferably in disk form, within such a comparatively flat and thin space is also one of the objects of my invention.

In the following I have described, in connection with the accompanying drawings, the preferred form of my invention, the features thereof being more particularly set forth hereinafter in the claims.

In the drawings Figure 1 is a perspective view of one form of my talking machine, with the casing open and the parts assembled ready for the closing of the casing and for transportation; Fig. 2 is a detail of one portion of the casing on the broken line 2—2 of Fig. 1, showing a means for supporting the reproducer arm, when not in use, in the cover or lid of the casing; Fig. 3 is a sectional view, parts being broken away, on the line 3—3 of Fig. 1, showing the relation of the disk records to the cover of the casing and the cushioning belt holding the records in place and preventing them from being damaged by the other parts of the machine; Fig. 4 is a perspective view of the casing closed; and Fig. 5 is a front elevation showing the talking machine proper in operative position, the resonance chamber or sound amplifying box being shown in transverse vertical section.

Similar numerals of reference indicate similar parts throughout the several views.

As shown in the drawings the casing comprises two portions, 10 and 11, portion 10 being adapted to contain the talking machine apparatus proper, as hereinafter referred to, and portion 11 being adapted to contain the disk records and reproducer arm when not in use, and to act as a cover to the portion 10. Portions 10 and 11 are shown as hinged together by hinges 12, 12, and provided respectively with a hasp or lock 13 for securing the two portions together when in closed position, and with a handle 14 for the ready carrying of the apparatus. 15 indicates a disk support mounted to rotate on motor shaft 16 in the usual manner, the shaft 16 being driven by any suitable motor mechanism (not shown) housed in portion 10 of the casing beneath disk support 15. 17 indicates a suitable brake device for controlling the starting and stopping of disk support 15 and 18 a suitable regulating device for the motor. These features constitute no part of my invention and may be of any well-known and suitable construction.

19 indicates the resonance chamber or sound amplifying box arranged at one end of portion 10. The walls of chamber 19 are of a suitable resonant material, such as wood, and the chamber is preferably V-shaped in cross section as shown in Fig. 5, the ends of the chamber being sloped or beveled from the top toward the bottom thereof as shown in Fig. 1, the chamber, as shown, being thus in the form of a triangular prism extending across the end of portion 10 with the end walls of the chamber flaring outwardly and upwardly.

The reproducer 21, as well as the reproducer arm 22, may be of any ordinary and well known type and construction.

23 indicates a collar at the end of the reproducer arm, adapted to have pivotal connection with said arm and to be fitted downwardly within socket piece 24 carried by bridge 25 extending across the middle portion of resonance chamber 19. The bridge 25 is preferably made of wood and is provided with an aperture 25′ registering with the opening in socket piece 24. The sound waves from the reproducer are thus conveyed by the reproducer arm through socket piece 24 and aperture 25′ into resonance chamber 19 whence the sound waves emerge through the spaces at either side of bridge 25. The form of resonance chamber described has proved to give a very clear, sweet and loud amplification of the sound waves coming from the reproducer and without the necessity of using an amplifying horn, or other sound conveying conduit.

As the machine is especially designed for ready portability in complete form ready for use at picnics or other transient entertainments, the casing is adapted to provide means for accommodating a considerable number of records, the whole device being a complete single, unitary or self contained apparatus. The records are indicated by R and are shown as housed within portion or cover 11 of the casing, and held in place by a strap 26. As shown, I have employed a strap having its outer ends attached to cover 11 at points 27 and 28, the inner ends being adjustably connected by buckle 29. The sizes of the casings may be varied to accommodate records of different diameters, the casing being preferably so constructed that the disks are in tangential contact with the opposite inner walls and one end of the same. The strap 26 holds the disks in place on the free side and forms a cushion for the disks against the end wall of the casing. Strap 26 moreover prevents the records from contacting with the socket piece 24 or shaft 16 should they project sufficiently into the cover when the casing is closed, both the strap and the socket and shaft being preferably so alined as to be superposed when the casing is closed. For this reason the strap is preferably made of fabric or other soft flexible material which will not damage or abrade the records and constitutes, in effect, a cushioning device preventing the records from coming into any damaging or abrading contact with any other part of the device, especially while undergoing transportation.

When disassembled and the casing is ready to be closed the reproducer and its arm are supported in cover 11, by frictional contact between sleeve 23 and socket piece 24ª, as well as by being seated in recessed block 30 secured at one end of the cover. Block 30 is also provided with a notch or recess 30' at the bottom into or through which the shank of winding crank 31 is slipped to hold the same securely in position.

32, 32, indicate dampers or sound deadeners hinged or otherwise secured at one side of the openings into resonance chamber 19 and at either side of bridge 25. The deadeners 32 may be felt covered to fit more or less tightly into said openings, the hinges 33, being adapted to hold them in any desired position or to permit them to be swung entirely away from said openings. By more or less closing and opening either one or both of said deadeners the sound issuing from the resonance box can be produced with more or less swell as desired or the full effect of the amplified sound from the resonance chamber can be obtained by leaving the openings thereto entirely free either by folding back said deadeners or by removing them altogether.

It is obvious that many of the details of construction and arrangement may be varied without departing from the spirit of the invention and I do not restrict myself to such details further than the scope of the appended claims demands.

What I claim and desire to secure by Letters Patent is:—

1. In a talking machine, a casing member, motor mechanism housed in said casing, a resonance chamber in said casing adjacent said motor mechanism, a bridge over a portion of said resonance chamber, said resonance chamber opening upward adjacent said bridge, means for deadening the sound from the resonance chamber; and reproducer means supported by said bridge and in communication from above with said resonance chamber, the sound waves being directed downwardly into said resonance chamber and then upwardly therethrough.

2. In a talking machine, a casing member, motor mechanism housed in said casing, a resonance chamber in said casing adjacent said motor mechanism, said resonance chamber comprising a V-shaped chamber having upwardly and outwardly flaring ends, a bridge over a portion of said resonance chamber and reproducer means supported by said bridge and in communication with said resonance chamber.

3. In a talking machine, a casing member, motor mechanism housed in said casing, a resonance chamber in said casing adjacent said motor mechanism, said resonance chamber comprising a V-shaped chamber having upwardly and outwardly flaring ends, a bridge spanning the middle portion of said chamber leaving sound openings at either side of said bridge and reproducer means supported by said bridge and in communication with said resonance chamber.

4. In a talking machine, a casing member, motor mechanism housed in said casing, a resonance chamber in said casing adjacent said motor mechanism, said resonance chamber comprising a V-shaped chamber having upwardly and outwardly flaring ends, a bridge spanning the middle portion of said chamber leaving sound openings at either side of said bridge, means for deadening the sound from said sound openings and reproducer means carried by said bridge and in communication with said resonance chamber.

5. The herein described talking machine comprising in combination, a casing composed of two substantially similar casing portions hinged together along adjacent edges, one of said portions constituting a base or bottom for the machine and adapted to house the motor mechanism and including a resonance chamber opening upward adjacent said motor mechanism, the other of said portions constituting a housing for a collection of records and also including means for supporting in definite position for transportation the detachable parts of the machine, and means adapted to coöperate with the collection of records to prevent abrasion or damage thereof.

6. The herein described talking machine comprising a cabinet consisting of two substantially equal portions hinged together at their adjacent edges and one being adapted to fold over or close upon the other, one of said portions constituting a base and housing the motor mechanism, the end of said portion constituting a sounding box having a concavity of triangular prismatic form, the same extending from one end to the other of one end of the base, reproducer means, a bridge spanning the middle portion of said sounding box concavity, and a tubular socket piece secured to said bridge and adapted to receive the end of the reproducer means whereby the sound is directed downwardly through the bridge and delivered in both directions laterally therefrom from the aforesaid concavity.

7. In a talking machine, the combination with a box-like base adapted to house operating and controlling devices for a record, one end of the base constituting a sounding box, a bridge extending across the middle portion of said sounding box and dividing the mouth thereof into two equal portions opening upwardly, said bridge having a hole formed downwardly therethrough, a tubular socket piece secured to the bridge and registering with said hole and reproducer means having a thimble at one end adapted to be fitted in said socket piece.

8. The herein described portable talking machine comprising a box-like cabinet consisting of two parts hinged together, one part constituting a base adapted to house the motor mechanism and controlling means therefor and also including a sound amplifier comprising a chamber open at the top adjacent said motor mechanism, and a reproducer arm support secured adjacent said sound amplifier, the other portion of the cabinet being adapted to house for transportation a collection of disks and having a supporting means for the reproducer arm and motor crank for securing them in fixed position, and a flexible pad or strap adapted to extend across the disks to protect them from abrasion.

In testimony whereof I have signed this specification in the presence of two subscribing witnesses.

THEODORE METZELER.

Witnesses:
SEABURY C. MASTICK,
K. G. LE ARD.